United States Patent [19]

Barsai et al.

[11] 3,994,563
[45] Nov. 30, 1976

[54] REFLECTING STEREOSCOPE WITH MEASURING DEVICE FOR THE EVALUATION OF STEREOPHOTOGRAPHS

[75] Inventors: János Barsai, Budapest; Sándor Ditrói, Miskolc; Tibor Illés; László Végh, both of Budapest, all of Hungary; Sándor Dékany, deceased, late of Budapest, Hungary, by Maria Dekany nee Mehlschmidt, heiress; Sándor Fazekas, deceased, late of Miskolc, Hungary, by Andrea Fazekas nee Saad, heir

[73] Assignee: Magyar Optikai Muvek, Budapest, Hungary

[22] Filed: Feb. 7, 1975

[21] Appl. No.: 548,178

[30] Foreign Application Priority Data
Feb. 7, 1974   Hungary............................ MA 2537

[52] U.S. Cl................................. 350/137; 33/1 A; 33/164 B; 356/2
[51] Int. Cl.²......................................... G02B 27/24
[58] Field of Search............ 356/2, 12; 350/10, 136, 350/137, 30; 33/1 A, 20 D, 164 B

[56] References Cited
UNITED STATES PATENTS
2,690,016   9/1954   Seaholm............................ 33/164 B
2,932,234   4/1960   Gunther................................ 356/12

OTHER PUBLICATIONS

McNeil, "Map Compilation with Stereometer-type Instruments" in *Manual of Photogrammetry*, Second Ed., Amer. Soc, Photogram., pp. 603–607, 1952.

*Primary Examiner*—John K. Corbin
*Assistant Examiner*—Matthew W. Koren
*Attorney, Agent, or Firm*—Young & Thompson

[57] ABSTRACT

A reflecting stereoscope has picture holders and oculars for the observation of pictures held by the picture holders, and an optical train between the picture holders and the oculars. Picture marks and measuring markers carrying adjustable measuring marks are interposed in the optical train and there is a measuring device for measuring the location of the measuring marks. The picture holders are disposed in the focal plane of the oculars and a lens system on the optical axis of the oculars projects the magnified image of the measuring marks onto the focal plane of the oculars. Partially reflecting mirrors in the light path of the optical train observe picture marks and the measuring marks. A special system for moving the measuring markers and measuring their position is provided.

5 Claims, 2 Drawing Figures

REFLECTING STEREOSCOPE WITH MEASURING DEVICE FOR THE EVALUATION OF STEREOPHOTOGRAPHS

This invention relates to a reflecting stereoscope with a measuring device for the evaluation of stereophotographs wherein picture holders for mounting the stereopairs, a partially combined optical system with oculars for the observation of picture markers and measuring markers, and a measuring device containing adjustable measuring markers are provided.

From the literature and from practical installations, numerous devices have been known suitable for the evaluation of stereoscopic photograph pairs produced by the stereographic method. These conventional arrangements serve, in part, merely for reproducing the three-dimensional, spatial image, i.e. stereoscopic image, while they are used, on the other hand, for the determination of the distance of individual points of these stereopairs from a previously determined basic plane.

Stereophotography methods are utilized, inter alia, frequently in the production of aerial photographs, but in more recent times also in medical practice, and even in the industrial field. When observing a stereogram made from the chest cavity of a sick person by means of an evaluating unit provided with a measuring device, the spatial position of the suspicious, diseased portions and the germ accumulations can be determined with sufficient accuracy. Also, it is possible to accurately determine the spatial location and distribution of cracks, shrinkholes, slag occlusions within large, complicated high-quality castings, and on the basis of such evaluation, a decision can be made already in this initial phase of a subsequent technical manufacturing process whether these castings should be further processed or whether they should be discarded as scrap.

The medical as well as industrial stereophotographs are produced with the aid of the so-called direct method. In this method, the body to be reproduced is disposed between the source of X-rays and the plane of the film. The evaluation of the photographs, i.e. the measurement, is generally effected with the aid of a so-called stereomicrometer wherein glass plates carrying measuring markers are first applied to the partial pictures, whereupon the measuring markers, with the aid of a micrometer spindle, are brought into congruence with the points of the partial pictures to be determined.

When knowing the basic sighting distance of the evaluating means, as well as the parameters, such as base and photographing distance, the spatial distance can be determined on the basis of the parallax value measured by means of the micrometer spindle by calculations or by means of previously prepared tables. The above method, especially the insertion of the required values into the formulae and the determination of the distance by calculations requires, however, a cumbersome and time-consuming operation. The rapid and effortless determination of the object point distance is, however, not only desirable but also of decisive importance in many cases. Thus, a rapid determination of the location of a foreign body can be of critical significance in urgent operations on the critical body parts or organs. Likewise, the information on spatial position and distribution of various items of interest in medical practice is very important when conducting investigations by means of contrast agents.

The invention is based on the problem of providing an apparatus for the evaluation of stereophotographs, making it possible to determine the distance of an examined image point from the plane of the X-ray screen on the basis of X-ray stereophotographs of a constant base or associated stereopairs of screen stereographs. Another object of this invention resides in providing suitable devices, with the aid of which the distance of a photographed object point from the film plane in case of stereophotographs of a constant base, with assurance of a stereoscopic vision, can be determined even by operators who are not especially and specifically qualified, without the use of any tables and without the necessity of performing calculations.

The above object is attained, according to this invention, with a reflecting stereoscope of the aforementioned type, wherein the plane of the picture holders lies in the focal plane of the oculars, optical elements with in part light-permeable reflective surfaces are disposed in the beam paths of the optical system, and one of the measuring markers can be fixed in position, while the other measuring marker is adjustable by a setting means. According to a further feature of the invention, the setting means of the adjustable measuring marker comprises a threaded sleeve inserted in a threaded bore of a bearing plate; a spindle is introduced into the internal thread of the threaded sleeve, and the latter is joined for rotation with an outer cylinder, while the spindle is connected for rotation with an inner cylinder arranged coaxially partially within the outer cylinder, the cylinders being adapted for the measurement and indication of the adjusting motions of the threaded sleeve and of the spindle.

According to the invention, the measuring markers are arranged on measuring marker frames which, in turn, are mounted and linearly guided in a support plate provided with light passage apertures and a guide track.

In the reflecting stereoscope of this invention, a graduated scale is mounted on the outer wall surface of the inner cylinder, this scale encompassing the entire measuring range in several, mutually axially offset partial sections at right angles to the axis of rotation. At the end periphery of the outer cylinder, V-shaped notches cooperating with a locking pin are disposed at equal angular spacings distributed over the circumference, while read-off slots are provided in the outer wall surface of the outer cylinder, these slots being phase-shifted with respect to one another in correspondence with the angular division of the notches and simultaneously being axially displaced by identical distances in association with the scales of the inner cylinder.

In one advantageous embodiment of the reflecting stereoscope of this invention, the bearing plate is rigidly attached to the support plate, the latter being mounted on a double slide. According to a further feature of the invention, flexible lighting cables are associated with the light passage apertures of the support plate, and the optical system for the picture and measuring marker observation possesses common oculars.

The advantages of the device of this invention reside in that, in addition to being able to oversee the entire image field, it is also possible to adjust the virtual image of the focused measuring marker to the point to be measured, and the adjustment of the parallax is effected while looking through the ocular by means of a corresponding rotation of the measuring cylinders of the measuring device, it being possible to immediately read off the exact distance values. Consequently, the rather complicated calculations and the use of tables are not longer necessary. The rapid execution of the measurement as made possible by the apparatus of this invention provides substantial advantages in industrial use as well as in medical practice. Moreover, the apparatus can be utilized for various types of photography.

As mentioned above, the spatial distance, i.e. the object distance of the object point to be measured can be directly read off from the measuring scale of the measuring device without having to conduct the calculations necessary heretofore. The rapidity with which information can be gained by means of the apparatus of this invention offers essential advantages primarily in the medical field and furthermore in industrial uses, as well as in accident investigations conducted at the site of the collision. Also, of further significance is the fact that the reflecting stereoscope of this invention can be employed successfully for the evaluation of stereopairs produced by means of holograms.

The basic aspects of the invention will be described in detail hereinbelow with reference to an embodiment as illustrated in the drawings.

Figure 1:
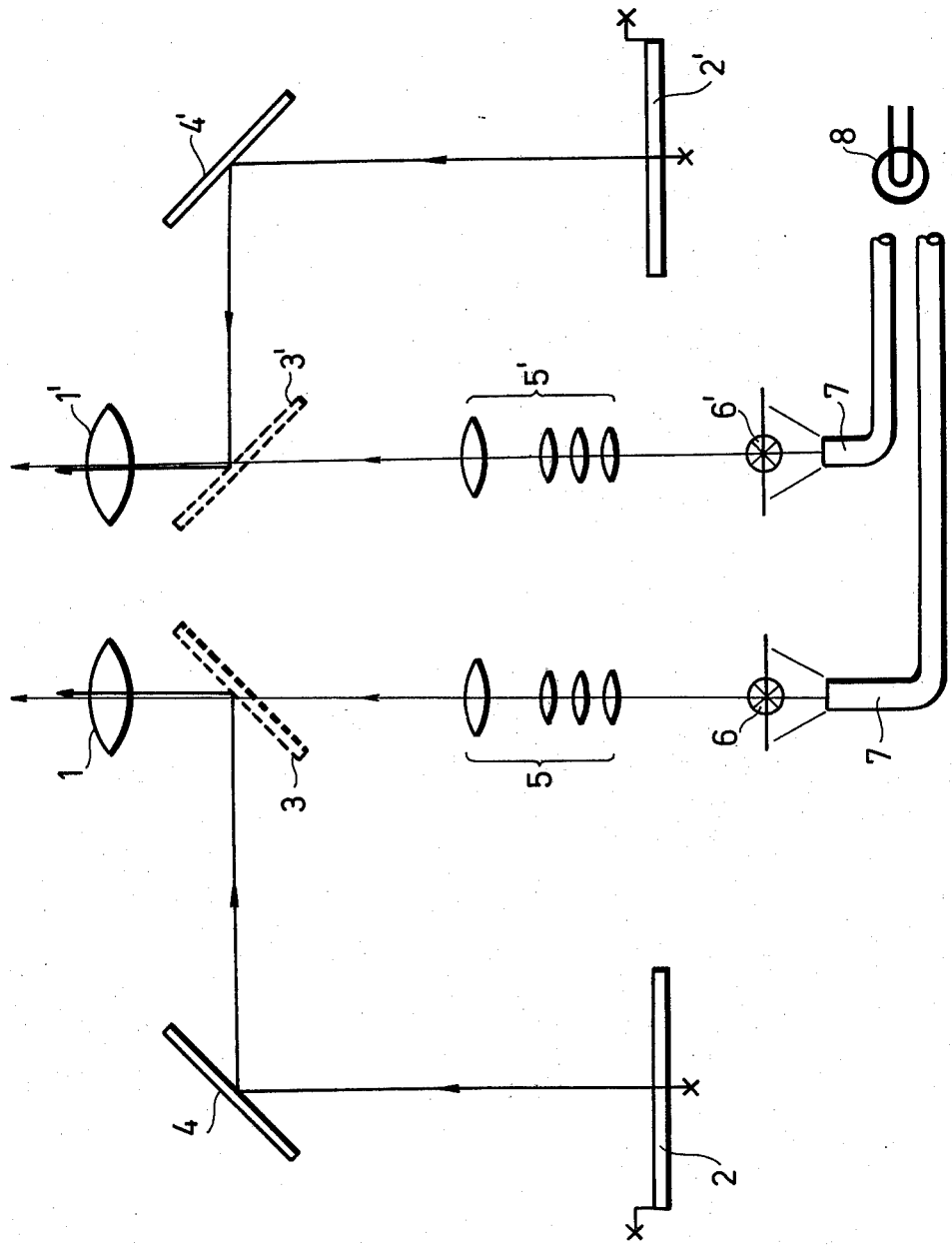
FIG. 1 is an illustration, in principle, of the optical system for the apparatus of this invention, as shown by way of example.

The optical system of the reflecting stereoscope of this invention, as shown in FIG. 1, comprises picture holders 2, 2'; the beam emanating from the partial pictures mounted on these picture holders can be observed via mirrors 4, 4' and optical elements 3, 3' partially provided with a light-permeable mirror surface through oculars 1, 1'. These components of the apparatus are dimensioned so that the focal distance of the oculars 1, 1' is at least 1.5 times the diagonal of the largest stereopairs usable in the picture holders 2, 2', and so that the exit pupil has a distance of at least 20 mm. from the ocular lenses. Under these conditions, the entire content of the picture formed by stereopairs with dimensions of, for example, 300 × 300 mm. can be observed. The picture holders 2, 2' and/or the plane of the stereopairs are located in the focal point of the optical system. Below the oculars 1, 1' are optical elements 3, 3' provided with a partially light-permeable reflecting surface, the reflecting surface respectively projecting the light beams emanating from the stereopairs mounted in the picture holders 2, 2' and being deflected by means of reflectors 4, 4' into the respective oculars 1, 1'. On the optical axis of the oculars 1, 1', respectively a lens system 5, 5' is disposed. These lens systems 5, 5' each forms together with the associated ocular 1, 1', respectively, an optical measuring marker observation system. Light-permeable plates, each carrying a measuring marker 6, 6', are located perpendicular to the optical axis of these measuring marker viewing systems in the focal plane. The measuring markers 6, 6' are illuminated by means of flexible light-conducting cables 7 supplied by a light source 8 which can be located at any desired point. The image of the measuring markers at infinity appears in the optical system, for example, with ten-fold magnification simultaneously with the entire image area of the stereopair. The magnification of the optical system made up of the oculars 1, 1' and the lens systems 5, 5' accordingly is ten. When adjusting the measuring markers 6, 6' and/or their measuring marker frames 9, 10 in the direction X (see FIG. 2) by an amount of 1 mm., the virtual image of the measuring markers 6, 6' moves by a value of 10 mm. Upon a simultaneous adjustment of both measuring markers 6, 6', it is thus possible to locate any desired point of the image area with the marker pair 6, 6'.

Figure 2:
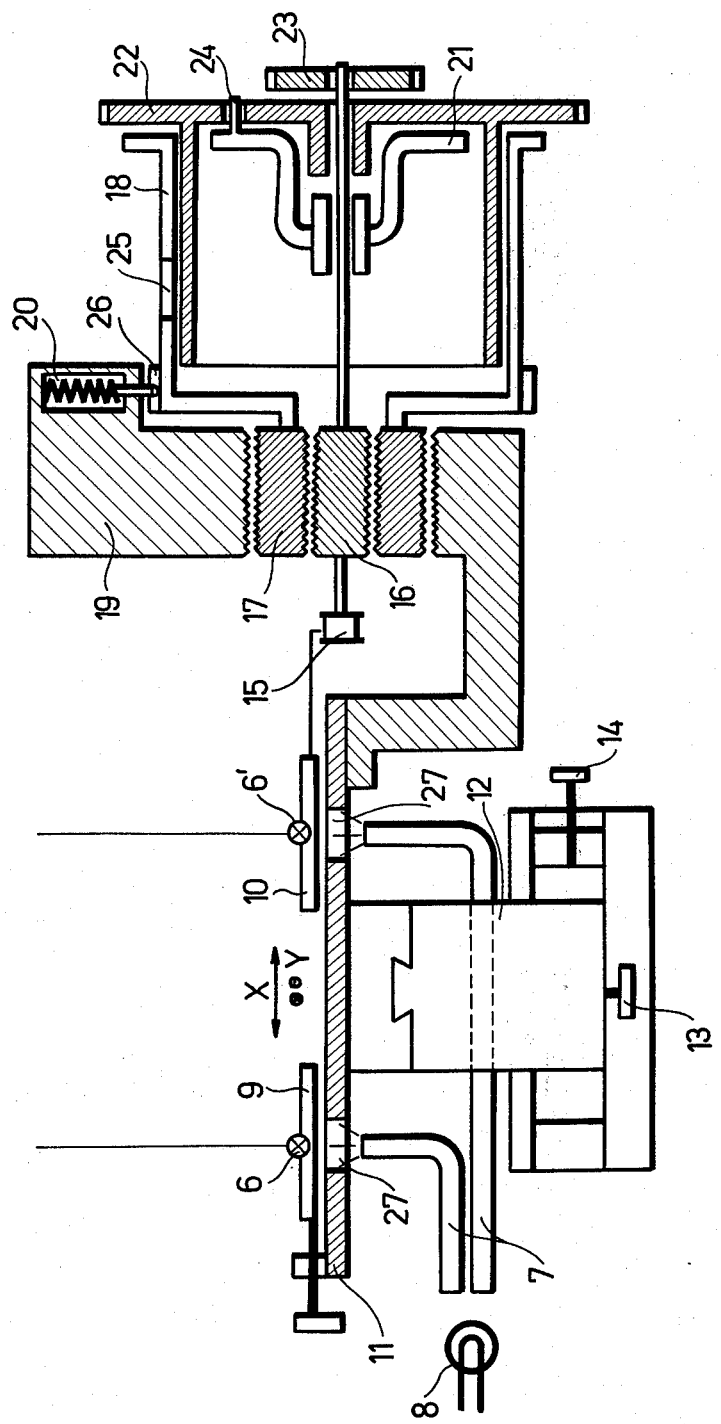
FIG. 2 is a schematic representation of one example of the measuring device.

In the example of the measuring device according to FIG. 2, as used for the reflecting stereoscope of this invention, the measuring markers 6, 6' are carried by measuring marker frames 9, 10 which are mounted on a support plate 11 in a plane at right angles to the optical axis. The support plate 11 is provided with light passage apertures 27 connected to light-conducting cables 7 to transilluminate the measuring markers 6, 6'. The support plate 11 is furthermore attached to a double slide 12 and can be adjusted, with the aid of a setting element 13, in the vertical direction, while the setting element 14 effects an adjustment in the horizontal direction. However, during this adjustment, the relative position of the measuring markers 6, 6' to each other remains unchanged. Looking through the ocular 1, 1', it is possible to locate the points of the image of the stereopair mounted in the picture holders 2, 2' for measuring purposes with the aid of the above-mentioned adjustment of the measuring markers 6, 6'. In case of an optical system having the magnification factor N, if the virtual image of the measuring markers 6, 6' is to be shifted by an amount of ΔC in the directional components X or Y, an adjustment of the measuring markers 6, 6' by respectively the amount of ΔC/N in the same directional components is required. (As indicated in FIG. 2, Y represents the direction perpendicular to the plane of the drawing, extending in the plane of the measuring marker frames 9, 10.) The measuring marker frames 9, 10 are adjustable with respect to the support plate 11 in the direction X also independently of each other. The location of the respective image points is conducted by means of the measuring device by operating the setting elements 13, 14, while preferably looking through the left-hand ocular 1. The setting of the parallax values is effected by looking through the right-hand ocular 1' while adjusting the right measuring marker 6' by a corresponding amount in the direction X by operating the measuring device. For this purpose, a setting means is provided, with the aid of which the measuring marker frame 10 carrying the measuring marker 6' is adjustably guided linearly in the direction X in a guide track of the support plate 11. The measuring marker frame 10 is connected, via a curved extension, with a drive means 15 with a spindle 16; the spindle 16 is seated in a threaded sleeve 17 provided with internal and external threads. The spindle 16 is thus rotatable with respect to the threaded sleeve 17, the free angle of rotation being restricted and limited to an angular amount smaller than 360°. The threaded sleeve 17 is inserted with its external thread in a corresponding threaded bore of a bearing plate 19, the latter being fixedly joined to the support plate 11. Consequently, the measuring marker 6' is seated in the measuring marker frame 10 which can be adjusted in the direction X with the aid of the rotation of the spindle 16 and/or the threaded sleeve 17 with regard to the support plate 11 and/or the bearing plate 19 with the drive means 15 by the same amount and in the same direction. An outer cylinder 18 is joined to the threaded sleeve 17 for rotation therewith. V-shaped notches 26 are formed along an end-face periphery of the outer cylinder at certain, mutually identical angular intervals. A locking pin 20 of a resilient detent means disposed in the bearing plate 19 can snap into these notches. The outer cylinder 18 thus can be fixed in certain phase positions. A further drive means 21 is attached to the rotary axle of the spindle 16; this drive means 21 carries an engaging pin 24. An inner cylinder 22 can be associated with this drive means 21 with the aid of the engaging pin 24 in a locked-together relation and with the possibility of exchange by means of a clamping ring 23. The inner cylinder 22 is coaxial with the outer cylinder 18 and extends into the interior of the latter.

A scale graduation is applied to the outer wall surface of the inner cylinder 22, comprising partial sections perpendicular to the axis of rotation, which divide the entire measuring range into several, respectively axially offset increments. Read-off slots 25 are provided in the outer surface of the external cylinder 18, which are correspondingly phase-shifted with respect to one another according to the angular distribution of the notches 26 and are simultaneously also associated, axially displaced by the same increments, with the partial sections of the scale graduation of the inner cylinder 22. The distances by which the scale sections are mutually axially offset and/or the above-indicated angular division of the read-off slots 25 are determined in dependence on the thread pitches of the threaded sleeve 17 so that, on the one hand, each of the read-off slots 25 makes it possible to read off the values of a specific scale section and, on the other hand, the rotation of the threaded sleeve 17 by the corresponding angular division with respect to the bearing plate 19 in each case compensates for a displacement of the entraining means 15 corresponding to the full freedom of rotation of the spindle 16. Thus, in the first arrested phase position of the outer cylinder 18, when the inner cylinder 22 is rotated, parallax values can be produced in correspondence with the readings of the first partial scale section, and these readings can be derived from the read-off slot formed as the first from the left in the outer surface of the external cylinder 18.

In the second arrested phase position of the outer cylinder 18, however, it is possible to set parallax values corresponding to the values of the second partial scale graduation, by rotating the inner cylinder 22 from one stop to the next; these values can be read off from the slot 25 which is the second one, as seen from the left. Analogously, in case of a measuring device with four scale graduations, four read-off slots 25 are also provided which are uniformly distributed along the circumference and are also distributed axially by identical distances, and the above remarks apply analogously in this sequence of slots.

The reflecting stereoscope selected as an example for explaining the invention is provided, for instance, with an inner cylinder 22 suitable for the evaluation of partial pictures 2, 2' of stereopairs taken with the parameters of basis $b = 80$ mm. and photographing distance $f = 1000$ mm. The vertical coordinates of object points can be measured which are, during the taking of the picture, 300 mm. above the plane of the film. The values of the first partial scale section run from 0 to 100; the values of the second partial section run from 100 to $n$; etc. In the individual locked positions, the read-off slot 25 whose associated scale section is to be read off at that particular time is always the one which is placed in the visible position accessible to the operator of the device for read-out purposes. The remaining read-off slots and/or their associated partial scale graduations, however, are not visible. The scale values indicate the distances of the individual points of the stereopair of the partial pictures 2, 2' from the definite photographing plane directly in millimeters.

The inner cylinder 22 is detachably joined to the spindle 16 and thus can be exchanged. A specific inner cylinder 22 is provided in each case with scale graduations valid for stereopairs of specific photographing parameters, i.e. basis and photographing distance. In other words, the reflecting stereoscope of this invention can be utilized, by exchanging this inner cylinder 22, for the evaluation of stereopairs produced by means of other photographing parameters.

What is claimed is:

1. In a reflecting stereoscope having picture holders, an optical system with reflecting surfaces and oculars for the observation of pictures on said picture holders with superposed picture marks and measuring marks, measuring markers carrying adjustable measuring marks and a measuring device; the improvement in which the picture holders (2, 2') are disposed in the focal plane of the oculars (1, 1'), lens systems (5, 5') disposed on the optical axis of the oculars (1, 1') for projecting the magnified image of the measuring marks onto the focal plane of the oculars (1, 1'), partially-reflecting mirrors (3, 3'), located in the light path of the optical system for combining images of the pictures and the measuring markers (6, 6') and having exit light axes facing said oculars (1, 1'), first entrance axes facing said lens systems (5, 5'), and second entrance axes facing reflectors (4, 4'), said reflectors being arranged to reflect light from said pictures to said partially-reflecting mirrors (3, 3'), a spindle (16) connected to one of the measuring markers (6'), a threaded sleeve (17) receiving the spindle (16) and threadedly guided in a bearing plate (19), the spindle (16) being connected to a measuring cylinder (22) having scale graduation, and the threaded sleeve (17) being connected to a read-off cylinder (18) coaxial with the measuring cylinder (22).

2. A reflecting stereoscope according to claim 1, in which the measuring cylinder (22) has its scale graduation in the form of several partial sections on its outer surface perpendicular to the axis of the cylinder.

3. A reflecting stereoscope according to claim 2, and V-shaped notches (26) at one end of the surface of the read-off cylinder (18), these notches being distributed at equal intervals and cooperating with a locking pin (20) on the bearing plate (19), and read-off slots (25) in the outer surface of the read-off cylinder (18) distributed axially at equal distances along the read-off cylinder and distributed at said intervals about the periphery of the read-off cylinder.

4. A reflecting stereoscope according to claim 3, in which the measuring marker frames (9, 10) holding the measuring markers (6, 6') are connected to a support plate (11) rigidly joined to the bearing plate (19) and having a guide path and light passage apertures (27).

5. A reflecting stereoscope according to claim 4, in which light-conducting cables (7) are connected to the light passage apertures (27) of the support plate (11).

* * * * *